(12) United States Patent
Jagtap et al.

(10) Patent No.: US 9,787,688 B2
(45) Date of Patent: Oct. 10, 2017

(54) IDENTIFYING ROLES WITH SIMILAR MEMBERSHIP AND ENTITLEMENT INFORMATION

(71) Applicant: Oracle International Corporation, Redwood Shores, CA (US)

(72) Inventors: Achyut Ramchandra Jagtap, Sunnyvale, CA (US); Muhammad Hamdan Nathersa, San Mateo, CA (US); Abhimanyu Seth, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 206 days.

(21) Appl. No.: 14/866,744

(22) Filed: Sep. 25, 2015

(65) Prior Publication Data
US 2016/0094561 A1    Mar. 31, 2016

Related U.S. Application Data

(60) Provisional application No. 62/056,301, filed on Sep. 26, 2014.

(51) Int. Cl.
*G06F 7/04* (2006.01)
*H04L 29/06* (2006.01)
(Continued)

(52) U.S. Cl.
CPC ........ *H04L 63/102* (2013.01); *G06F 21/6218* (2013.01); *G06Q 10/105* (2013.01)

(58) Field of Classification Search
CPC ... H04L 63/102; H04L 63/104; H04L 65/403; H04L 41/0803; G06F 21/604; G06F 17/30557
See application file for complete search history.

(56) References Cited

U.S. PATENT DOCUMENTS 7,404,203 B2 *   7/2008  Ng .................... G06F 21/6227
                                                    713/165
7,613,794 B2 *  11/2009  Delaney ................ G06F 21/31
                                                    707/999.003
(Continued)

FOREIGN PATENT DOCUMENTS

CN    WO 2012162873 A1 * 12/2012  .......... H04L 63/102

*Primary Examiner* — Farid Homayounmehr
*Assistant Examiner* — Lizbeth Torres-Diaz
(74) *Attorney, Agent, or Firm* — Kilpatrick Townsend & Stockton LLP

(57) ABSTRACT

Techniques are disclosed for identifying roles with similar membership and/or entitlement information in an identity management system of an enterprise. A role defined in an identity management system may be associated with membership information and entitlement information. The membership information may identify one or more members who has been assigned the role. The entitlement information may determine how members of the role can interact with a target system within the enterprise. The entitlement information may include a list of actions that members of the role can perform on the target system. Embodiments allow for identifying roles that have similar membership and/or entitlement information. If an existing role already gives similar entitlement(s) to similar member(s), the role may be prevented from being created. Thus, embodiments prevent creating and maintaining redundant roles.

14 Claims, 6 Drawing Sheets

(51) Int. Cl.
*G06Q 10/10* (2012.01)
*G06F 21/62* (2013.01)

(56) References Cited

U.S. PATENT DOCUMENTS

| | | | | |
|---|---|---|---|---|
| 7,792,860 | B2* | 9/2010 | Shrivastava | G06Q 10/107 |
| | | | | 707/756 |
| 8,543,616 | B2* | 9/2013 | Machiraju | G06Q 30/02 |
| | | | | 705/14.18 |
| 2008/0320549 | A1* | 12/2008 | Bertino | G06F 21/604 |
| | | | | 726/1 |
| 2012/0198358 | A1* | 8/2012 | Carrer | G06Q 10/10 |
| | | | | 715/753 |
| 2015/0127406 | A1* | 5/2015 | Hoen, IV | G06Q 10/06312 |
| | | | | 705/7.22 |

* cited by examiner

IDENTIFYING ROLES WITH SIMILAR MEMBERSHIP AND ENTITLEMENT INFORMATION

CROSS-REFERENCES TO RELATED APPLICATIONS

The present application is a non-provisional of and claims the benefit and priority under 35 U.S.C. 119(e) of U.S. Provisional Application No. 62/056,301, filed Sep. 26, 2014, the entire contents of which are incorporated herein by reference for all purposes.

BACKGROUND

The present disclosure relates generally to an identity management system, and more specifically to techniques for performing role lifecycle management in an identity management system.

For an enterprise comprising multiple target systems with multiple resources provided by the target systems, an identity management system may be used to define and control how users of the enterprise interact with the various enterprise resources. The identity management system may enable various roles to be defined and assigned to users. When a role is assigned to one or more users, the users become members of the role. A role may also be associated with one or more entitlements, where an entitlement defines the manner in which a member of the role can interact with one or more targets systems of the enterprise. For example, a manager role may be defined that grants a member of that role read and write access to an inventory database of the enterprise. As a result of this role assignment, members of the manager role (e.g., entities who have been assigned the manager role) may access the inventory database and can read information from or to write information to the inventory database.

Conventional identity management systems typically do not put many restrictions on how roles are created within the enterprise. As a result, over time, multiple roles may get created that have similar parameters, such as similar membership, similar entitlements, or other role-associated parameters. This not only makes the management of roles within the enterprise difficult but it also exposes the enterprise to security risks. For example, consider a situation where an entitlement given to a user is to be removed or revoked, a task that is typically performed manually by a system administrator. In an environment comprising multiple roles with overlapping or similar parameters, this becomes a non-trivial task because the same entitlement could be given to the user via multiple different roles and it may not be possible for the system administrator to identify all such roles in a timely manner. This in turn may result in a user retaining unauthorized entitlements thereby exposing the enterprise systems to increased risk. The problem is further compounded as the number of users, number of roles, number of entitlements, and the number of target systems and resources increases. Moreover, unnecessary computing resources are allocated for creating and maintaining roles with redundant parameters.

Some conventional tools exist for checking membership and entitlement information associated with a role when the role is being assigned to a user, or for checking if a role being assigned to the user has already been assigned to the user, but these tools do not provide a solution to the various problems discussed above.

BRIEF SUMMARY

The present disclosure relates generally to an identity management system, and more specifically to techniques for identifying roles with similar associated parameters such as similar membership and/or similar entitlement information in an identity management system of an enterprise.

In certain embodiments, multiple roles may be defined in an enterprise identity management system and assigned to users of the enterprise. Each role may have associated membership information identifying one or more users who has been assigned the role (i.e., members of the role). A role may also have associated entitlement information identifying one or more entitlements provided by that role to members of the role. An entitlement may identify how members of the role can interact with a target system within the enterprise. For example, the entitlement information may identify a list of actions that members of the role can perform on the enterprise target systems and resources provided by the target systems.

In certain embodiments, techniques are described for identifying roles that are deemed to be similar due to similarity of their membership, similarity of their associated entitlement information, and/or similarity of some role-associated parameter. The similarity analysis may be triggered due to various conditions such as when a new role is being created for the enterprise, when an existing role is being modified, when a role is being audited, and the like.

For example, the similarity analysis may be performed when a new role is being created. When invoked, the similarity analysis may measure a degree of similarity between the new role being created and existing roles configured for the enterprise based upon some role-associate parameter such as roles membership, roles entitlements, etc. The analysis may identify one or more existing roles that have a similar membership, similar entitlement information, or other parameters, as the role that is being created. When similarities are identified, information related to the similarities may be outputted (e.g., displayed, printed, written on a file, etc.) for user (e.g., system administrator) review.

The user may then take various actions responsive to the outputted information. For example, the user may decide not to create the new role if the user can use an existing role instead. In certain embodiments, the new role may be prevented from being created. In this manner, by identifying existing roles that are deemed similar based upon comparison of some role-associated parameter, the creation of roles with similar associated information is reduced. This in turn helps reduce the overall number of roles defined for an enterprise and reduces the burden of managing these roles.

As indicated above, when similarities are identified, information may be output to a user identifying the similarities. For example, for a new role being created, information that is output to a user may include information identifying members and/or entitlements defined for the new role that are common with existing roles configured for the enterprise, members and/or entitlements that are new (e.g., that are not defined for existing roles), members and/or entitlements information that are defined for the existing roles but not defined for the new role, and the like. This information may be output to the user via a graphical user interface (GUI). The user may proceed with role creation or may modify the parameters of the new role based on the similarity analysis results.

Various different techniques may be used to determine when information specified for a parameter associated with a first role is similar to information specified for the same parameter for a second role. In one embodiment, the parameters may be determined to be similarity if there is a substantial overlap between the parameters information. For example, if the parameter being compared is roles membership, then in one embodiment, the membership of the first role may be determined to be similar to the membership of the second role if the number of users that are both members of the first role and members of the second role is above a threshold (e.g., 90% of the members of the first role and second role are same). For example, if the parameter being compared is roles entitlements, then in one embodiment, the entitlements associated with a first role may be determined to be similar to the entitlements associated with a second role based upon the degree of overlap (e.g., over 90%) of the entitlements provided by the two roles. In some embodiments, multiple parameters (e.g., both membership and entitlements) associated with the first and second roles may be analyzed to determine similarities, independently or in conjunction (e.g., at least 90% overlap in membership and entitlements).

Various techniques (e.g., methods, systems, non-transitory computer-readable storage memory storing a plurality of instructions executable by one or more processors, etc.) are described for identifying similar membership information between two or more roles. In certain embodiments, a computer system may determine, responsive to a triggering event, membership information associated with a first role. For example, the triggering event may be triggered when the first role is being created, modified or approved. The membership information associated with the first role may identify a set of one or more members of the first role. The computer system may also determine a plurality of roles configured for a set of target systems, where the plurality of roles do not include the first role. For each role in the plurality of roles, the computer system may determine a set of one or more members for the role in the plurality of roles. For each role in the plurality of roles, the computer system may also determine a similarity score for the role in the plurality of roles based upon the set of members of the first role and the set of members of the role in the plurality of roles. The computer system may then determine at least a second role from the plurality of roles based upon the similarity scores determined for the roles in the plurality of roles. In some embodiments, the computer system may determine multiple roles from the plurality of roles based upon the similarity scores determined for the roles in the plurality of roles. Information related to at least the second role (or all other determined roles) may be output, for example for user (e.g. system administrator) review.

In some embodiments, the computer system may also determine, responsive to the triggering event, entitlement information associated with the first role. The entitlement information may identify one or more entitlements granted to the one or more members of the first role. An entitlement may determine how a member of the first role interacts with a target system. For each role in the plurality of roles, the computer system may also determine a set of one or more entitlements for the role in the plurality of roles. For each role in the plurality of roles, the computer system may also determine the similarity score for the role in the plurality of roles based upon the set of entitlements of the first role and the set of entitlements of the role in the plurality of roles, and/or based upon the set of members of the first role and the set of members of the role in the plurality of roles. The computer system may then determine at least a third role from the plurality of roles based upon the similarity scores determined for the roles in the plurality of roles. In some embodiments, the computer system may determine multiple roles from the plurality of roles based upon the similarity scores determined for the roles in the plurality of roles. Information related to at least the third role (or all other determined roles) may be output. For example, information related to the third role may be output along with information related to the second role. In some embodiments, the third role may be the same as the second role.

In some embodiments, the computer system may determine a set of common members comprising one or more members that are included in the set of members of the first role and also included in the set of members of the role in the plurality of roles. The computer system may determine a set of common entitlements comprising one or more entitlements that are included in the set of entitlements of the first role and also included in the set of entitlements of the role in the plurality of roles. The computer system may also determine the similarity score for the role in the plurality of roles based upon a number of members in the set of common members and a number of entitlements in the set of common entitlements.

Various techniques (e.g., methods, systems, non-transitory computer-readable storage memory storing a plurality of instructions executable by one or more processors, etc.) are described for identifying similar entitlement information between two or more roles. In certain embodiments, a computer system may determine, responsive to a triggering event, entitlement information associated with a first role. For example, the triggering event may be triggered when the first role is being created, modified or approved. The entitlement information associated with the first role may identify one or more entitlements granted to a set of one or more members of the first role. An entitlement may determine how a member of the first role interacts with a target system. The computer system may also determine a plurality of roles configured for a set of target systems, where the plurality of roles do not include the first role. For each role in the plurality of roles, the computer system may determine a set of one or more entitlements for the role in the plurality of roles. For each role in the plurality of roles, the computer system may also determine a similarity score for the role in the plurality of roles based upon the set of entitlements of the first role and the set of entitlements of the role in the plurality of roles. The computer system may then determine at least a second role from the plurality of roles based upon the similarity scores determined for the roles in the plurality of roles. In some embodiments, the computer system may determine multiple roles from the plurality of roles based upon the similarity scores determined for the roles in the plurality of roles. Information related to at least the second role (or all other determined roles) may be output, for example for user (e.g. system administrator) review.

In some embodiments, the computer system may also determine, responsive to the triggering event, membership information associated with the first role. The membership information associated with the first role identifies the set of one or more members of the first role. For each role in the plurality of roles, the computer system may also determine a set of one or more members for the role in the plurality of roles. For each role in the plurality of roles, the computer system may also determine the similarity score for the role in the plurality of roles based upon the set of members of the first role and the set of members of the role in the plurality of roles, and/or based upon the set of entitlements of the first role and the set of members of the role in the plurality of roles. The computer system may then determine at least a third role from the plurality of roles based upon the similarity scores determined for the roles in the plurality of roles. In some embodiments, the computer system may determine multiple roles from the plurality of roles based upon the similarity scores determined for the roles in the plurality of roles. Information related to at least the third role (or all other determined roles) may be output. For example, information related to the third role may be output along with information related to the second role. In some embodiments, the third role may be the same as the second role.

In some embodiments, the computer system may determine a set of common entitlements comprising one or more entitlements that are included in the set of entitlements of the first role and also included in the set of entitlements of the role in the plurality of roles. The computer system may determine a set of common members comprising one or more members that are included in the set of members of the first role and also included in the set of members of the role in the plurality of roles. The computer system may also determine the similarity score for the role in the plurality of roles based upon a number of members in the set of common members and a number of entitlements in the set of common entitlements.

The foregoing, together with other features and embodiments will become more apparent upon referring to the following specification, claims, and accompanying drawings.

DETAILED DESCRIPTION

Figure 1:
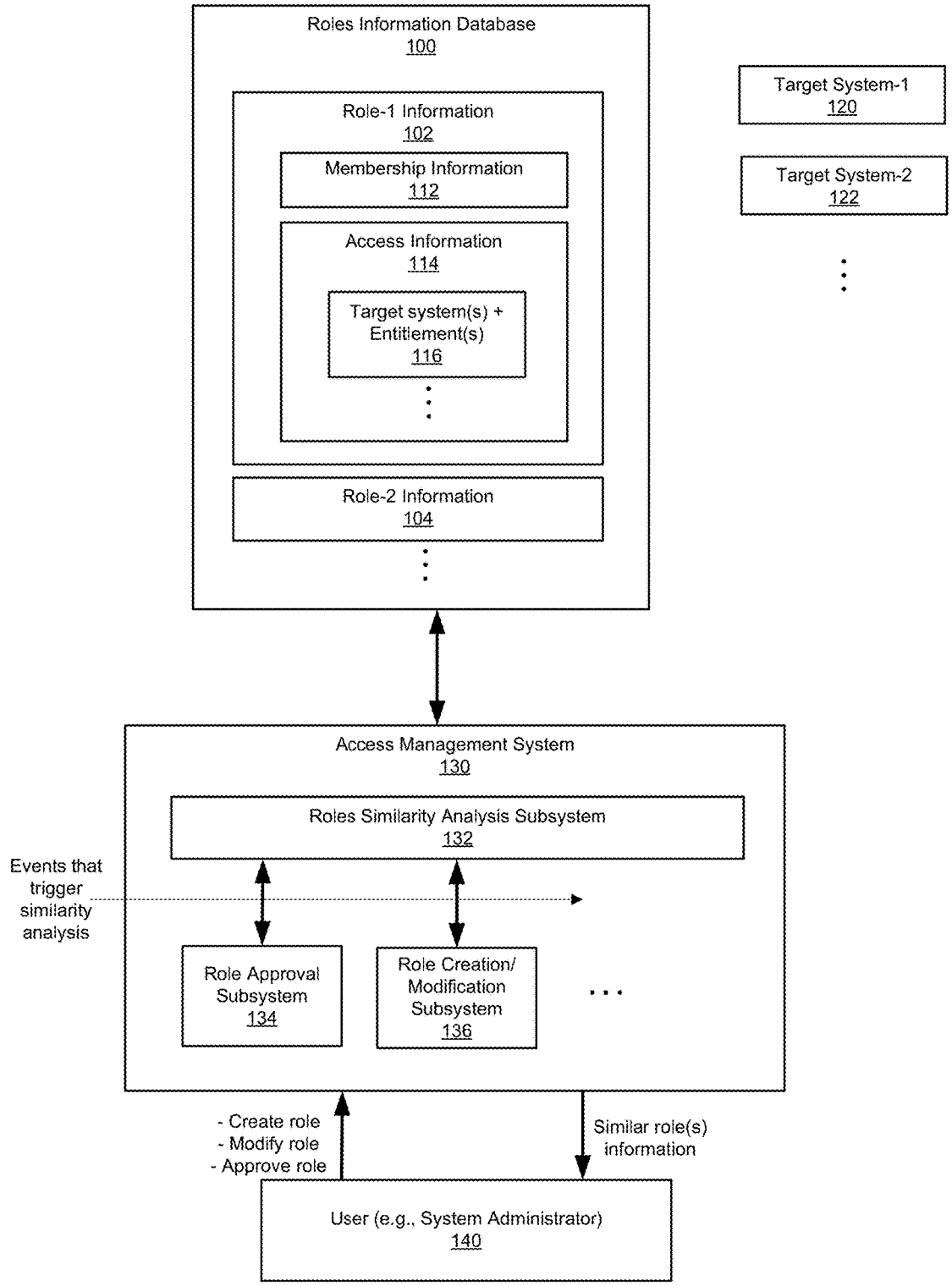
FIG. 1 depicts a simplified high level diagram of an identity management environment that may incorporate an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

In certain embodiments, multiple roles may be defined in an enterprise identity management system and assigned to users of the enterprise. Each role may have associated membership information identifying one or more users who has been assigned the role (i.e., members of the role). A role may also have associated entitlement information identifying one or more entitlements provided by that role to members of the role. An entitlement may identify how members of the role can interact with a target system within the enterprise. For example, the entitlement information may identify a list of actions that members of the role can perform on the enterprise target systems and resources provided by the target systems.

In certain embodiments, techniques are described for identifying roles that are deemed to be similar due to similarity of their membership, similarity of their associated entitlement information, and/or similarity of some role-associated parameter. The similarity analysis may be triggered due to various conditions such as when a new role is being created for the enterprise, when an existing role is being modified, when a role is being audited, and the like.

For example, the similarity analysis may be performed when a new role is being created. When invoked, the similarity analysis may measure a degree of similarity between the new role being created and existing roles configured for the enterprise based upon some role-associate parameter such as roles membership, roles entitlements, etc. The analysis may identify one or more existing roles that have a similar membership, similar entitlement information, or other parameters, as the role that is being created. When similarities are identified, information related to the similarities may be outputted (e.g., displayed, printed, written on a file, etc.) for user (e.g., system administrator) review.

The user may then take various actions responsive to the outputted information. For example, the user may decide not to create the new role if the user can use an existing role instead. In certain embodiments, the new role may be prevented from being created. In this manner, by identifying existing roles that are deemed similar based upon comparison of some role-associated parameter, the creation of roles with similar associated information is reduced. This in turn helps reduce the overall number of roles defined for an enterprise and reduces the burden of managing these roles.

As indicated above, when similarities are identified, information may be output to a user identifying the similarities. For example, for a new role being created, information that is output to a user may include information identifying members and/or entitlements defined for the new role that are common with existing roles configured for the enterprise, members and/or entitlements that are new (e.g., that are not defined for existing roles), members and/or entitlements information that are defined for the existing roles but not defined for the new role, and the like. This information may be output to the user via a graphical user interface (GUI). The user may proceed with role creation or may modify the parameters of the new role based on the similarity analysis results.

Various different techniques may be used to determine when information specified for a parameter associated with a first role is similar to information specified for the same parameter for a second role. In one embodiment, the parameters may be determined to be similarity if there is a substantial overlap between the parameters information. For example, if the parameter being compared is roles membership, then in one embodiment, the membership of the first role may be determined to be similar to the membership of the second role if the number of users that are both members of the first role and members of the second role is above a threshold (e.g., 90% of the members of the first role and second role are same). For example, if the parameter being compared is roles entitlements, then in one embodiment, the entitlements associated with a first role may be determined to be similar to the entitlements associated with a second role based upon the degree of overlap (e.g., over 90%) of the entitlements provided by the two roles. In some embodiments, multiple parameters (e.g., both membership and entitlements) associated with the first and second roles may be analyzed to determine similarities, independently or in conjunction (e.g., at least 90% overlap in membership and entitlements).

In some embodiments, similarity between the membership and/or entitlement information of a first role and a second role may be determined by calculating a similarity score for the second role. The first role may be a role that is being created by the user. The second role may be an existing role that has been already created. The similarity score may be determined based on an amount of the members of the first role that is similar to the members of the second role. For example, the first role may have 10 members, 9 of which may be the same as the members of the second role. Based on the similarity, the second role may be assigned a similarity score of 90%. The membership information of the first role may also be compared to another existing role, e.g. third role. For example, 8 out of 10 members of the first role may be the same as the members of the third role. Based on the similarity, the third role may be assigned a similarity score of 80%. The similarity scores assigned to the second role and the third role may be displayed to the user during the role generation process of the first role.

In some embodiments, the system may compare the similarity score(s) to a predetermined similarity threshold. If the similarity score exceeds the similarity threshold, the system may prevent the new role from being created. For example, if the similarity threshold is 85%, and an existing role has a similarity score of 90%, the system may prevent the new role from being created. In some embodiments, the system may provide feedback to the user. For example, the system may indicate that a role with a similar membership or entitlement information already exits and recommend that the user modify the members or entitlements of the new role. On the other hand, if the if the similarity threshold is 85%, and an existing role has a similarity score of 80%, the system may proceed with creating the new role.

In other embodiments, the system may output a predetermined amount of top similarity scores along with corresponding existing roles. For example, the system may output the top three similarity scores (regardless of how they compare to a threshold) along with corresponding existing roles.

While certain embodiments have been disclosed describing how the membership and entitlement information can be used to identify similarities between a new role and one or more existing roles, this is not intended to be restrictive. In addition to the membership and entitlement information, similarity between roles may be determined using other parameters.

FIG. 1 depicts a simplified high level diagram of an identity management environment for an enterprise that may incorporate an embodiment of the present invention. As shown, the identity management environment may include a roles information database 100 to store information for existing roles. For example, the roles information database 100 may store role-1 information 102 for a first existing role, role-2 information 104 for a second existing role, etc. A role as used herein may be assigned to a user in the identity management environment. Each role may have a membership information and access information associated therewith. For example, the role-1 information 102 may include membership information 112 and access information 114. The membership information of a role may determine the members (e.g. the users) who has been assigned the role. The access information may include entitlements that are granted by the role. An entitlement may determine how a member of the role interacts with a target system. The target system may include any application within an organization (e.g., within an enterprise organization) such as, an email server, an inventory database, a human resources management application, a payment processing application, etc. The entitlement may include a list of actions that the member of the role can perform on the target system. For example, the entitlement may indicate that the user may read the contents of the target system, modify the contents of the target system, etc. As shown, access information 114 for the first existing role may include target systems and entitlements information 116 that illustrate the entitlements that are granted by the first existing role to the target systems, such as target system-1 120, target system-2, 122, etc.

In some embodiments, a user (e.g., a system administrator) 140 may interact with an access management system 130 to create a new role, modify an existing role or approve a new role. For example, the user 140 may submit a new role creation request or a request to modify an existing role to a role creation/modification subsystem 136. Yet in another example, the user may submit an approval request for a new role to role approval subsystem 134. The request to crate, modify or approve a role may be a triggering event that triggers a roles similarity analysis subsystem 132 of the access management system 130 to perform a similarity analysis between the role that is being submitted by the user 140 and one or more existing roles stored in roles information database 100.

The roles information database 100 may store role information for existing roles. In some embodiments, one or more roles may be active for a limited amount of time. For example, one or more roles may have a start date and time, and end date and time. The roles similarity analysis subsystem 132 of the access management system 130 to perform a similarity analysis between the role that is being submitted and one or more exiting roles including those that are active during the same time as the role being submitted. For example, if the role being submitted has an active period of two months starting from the current time, the roles similarity analysis subsystem 132 may perform a similarity analysis between the role that is being submitted and one or more existing roles that will be active for the next two months. Accordingly, the roles similarity analysis subsystem 132 may not consider existing roles that are inactive for the next two months in the similarity analysis of the role being submitted by the user 140.

Membership Information Based Analysis

For purposes of explanation, it is assumed that the similarity analysis performed by roles similarity analysis subsystem 132 is triggered when user 140 submits a request to create a new role to the role creation and approval subsystem 136 and provides membership information for the new role being created. As previously indicated, various other conditions may also trigger the similarity analysis. The similarity analysis subsystem 132 then performs a similarity analysis based upon the membership information of the new role and the membership information for existing roles defined for the multiple targets systems in the enterprise. As part of this analysis, roles similarity analysis subsystem 132 may determine the membership information associated with the new role and identify a set of members of the new role. The similarity analysis subsystem 132 may then determine a set of existing roles configured for a set of target systems and membership information for each of the set of existing roles. For each role in the set of existing roles, roles similarity analysis subsystem 132 may then be configured to determine a similarity score for the existing role based upon a comparison of the set of members of the existing role and the membership of the new role, where the similarity score computed for an existing rule indicates a degree of similarity between the membership of the existing role and the membership of the new role. Based on an amount of common members that are included in the new role and each existing role, the similarity analysis subsystem 132 may assign a similarity score to each existing role.

Similarity analysis subsystem 132 may use various different techniques for computing the similarity scores. According to one technique, the similarity score for an existing role (e.g., role-1 in FIG. 1) may be a number indicating the number of users that are both members of the new role and the existing role. For example, for existing role-1, based upon membership information 112 for role-1, similarity analysis subsystem 132 may identify that 9 members of the new role are also members of role-1 and a similarity score of "9" may be computed for role-1. Likewise, based upon roles information 104 for an existing role-2, similarity analysis subsystem 132 may identify that 5 members of the new role are also members of role-2 and a similarity score of "5" may be computed for role-2. In this manner, a similarity score based upon the number of overlapping members between the new role and the existing roles may be computed for the existing roles.

According to another technique, the similarity score for an existing role may be a number indicating the number of users that are both members of the new role and the exiting role expressed as a percentage of the total membership of the new role. For example, if the new role has 10 total members and it is determined that 9 of those members are also members of existing role-1, then a similarity score of 90% may be computed for existing role-1. Likewise, upon determining that 5 of the 10 members of the new role are also members of existing role-2, then a similarity score of 50% may be computed for existing role-2. In this manner, similarity scores may be computed for the existing roles. Various other similarity scoring techniques may be used in alternative embodiments.

The similarity scores are then used by similarity analysis subsystem 132 to determine if any of the existing roles have a membership that is deemed to be similar to the membership of the new role. In one embodiment, the membership of an existing role may be deemed to be similar to the membership of the new role if the similarity score computed for that existing role exceeds a certain preconfigured threshold and to be not similar otherwise. For example, in an embodiment where the similarity score is indicative of a number of users that are both members of the new role and the exiting role expressed as a percentage of the total membership of the new role, the threshold may be set to 85%, i.e., membership of an existing role is considered to be similar to the membership of the new role if the similarity score associated with the existing role is above 85%. In such an embodiment, using the role-1 and role-2 example discussed above, similarity analysis subsystem 132 may determine that the membership information of role-1 is similar to the membership of the new role since the similarity score computed for role-1 is 90%, but that the membership of role-2 is not similar to the membership of the new role since the similarity score computed for existing role-2 is 80%, which is below the similarity threshold. In this manner, based upon the similarity scores computed for the existing roles and the similarity threshold value, similarity analysis subsystem 132 may identify roles whose memberships are deemed similar to the membership of the new role.

Various different actions may be performed in response to the results of the similarity analysis. In certain embodiments, information related to the results of the similarity analysis may be output to user 140. The user may then decide whether or not to continue creating the new role based upon the output results.

In one embodiment, upon determining that at least one existing role has membership that is determined to be similar to the membership of the new role being created, similarity analysis subsystem 132 (or access management system 130) may prevent the user 140 from creating the new role. The similarity analysis subsystem 132 may notify the user that an existing role, e.g., role-1, have a membership that is determined to be similar to the membership of the new role that the user is trying to create and that, as a result, creation of the new role is prevented. In this manner, creation of roles with similar memberships is prevented. In some embodiments, the similarity analysis subsystem 132 may prompt the user to modify the membership for the new role if the new role is to be created.

In certain embodiments, a similarity threshold may not be set for similarity analysis subsystem 132. In such an embodiment, the similarity analysis subsystem 132 may be configured to select one or more existing roles from the set of existing roles based upon the similarity scores associated with the scores and output information related to those one or more roles to the user. In one embodiment, similarity analysis subsystem 132 may select a predetermined number of top similarity scores and output information related to the associated existing roles to the user. For example, the similarity analysis subsystem 132 may output the top two similarity scores (e.g., 90% and 80%, assuming these are the top two scores) along with corresponding roles information (e.g., role-1 and role-2, respectively).

In the embodiment described above, the membership of the new role was compared to the memberships of individual existing roles. In some other embodiments, the similarity analysis subsystem 132 may identify a combination of two or more of existing roles where a combination (e.g., a union of the memberships) of the memberships of the two or more existing roles is similar to the membership of the new role. In such an embodiment, the similarity analysis subsystem 132 may assign a similarity score to the combination of the two or more existing roles and compare the similarity score of the combination to the predetermined threshold.

For example, the members of the new role may include A, B, C, and D. The members of existing role-1 may include A and B. The members of existing role-2 may include C and D. Taken individually, the similarity score assigned to each of existing role-1 and role-2 may be 50%, which is lower than the predetermined threshold of 85%. However, when taken as a combination (e.g., union of the membership of role-1 and role-2), role-1 and role-2 include all members of the new role. Thus, a similarity score assigned to the combination of role-1 and role-2 would be 100%. In such a scenario, the access management system 130 may prevent the user 140 from creating the new role based on the similarity score of the combination of existing role-1 and existing role-2 (e.g., 100%) which exceeds the similarity threshold of 85%. The similarity analysis subsystem 132 may notify the user that a combination of two or more existing roles, e.g. role-1 and role-2, has a similar membership to the new role that the user is trying to create. In some embodiments, the similarity analysis subsystem 132 may suggest the user to modify the membership information of the new role.

In the foregoing exemplary embodiment, in one embodiment, the similarity score of the combination of existing role-1 and role-2 is not determined by merely taking the sum of individual similarity scores of role-1 and role-2. Rather, the similarity score is calculated for the membership information of the combination of role-1 and role-2. For example, if the members of role-3 include A, role-3 will have a similarity score of 25% (e.g., 1 out of 4 members of the new role is similar with members of role-3). However, the combination of role-1 and role-3 will not have the similarity score of 75%. Rather, the similarity score for the combination of role-1 and role-3 will be 50% (2 out of 4 members of the new role are similar with members of the combination of role-1 and role-3).

Figure 2:
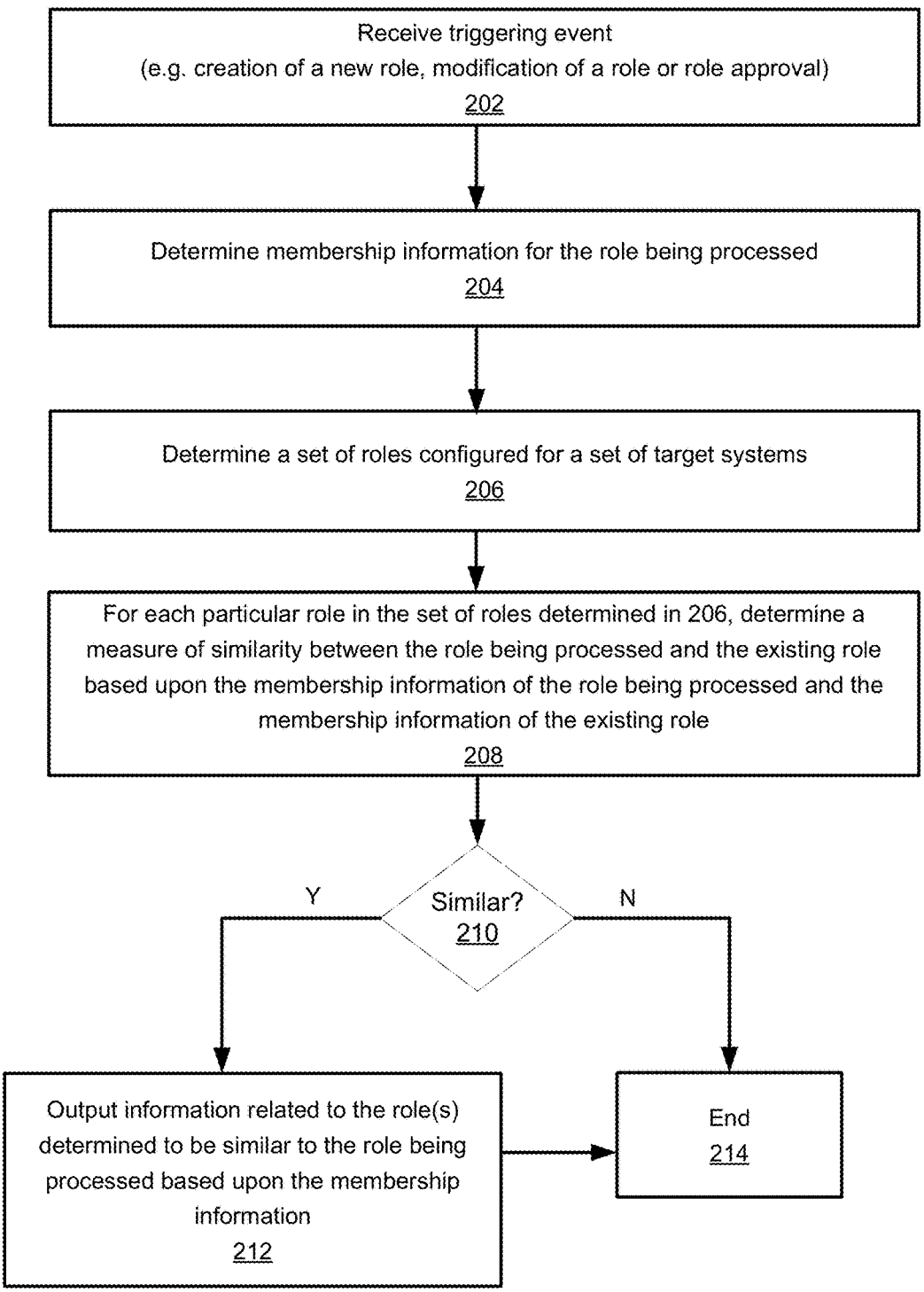
FIG. 2 depicts a simplified flowchart depicting processing performed for identifying roles with similar membership information in an identity management environment according to an embodiment of the present invention.

FIG. 2 depicts a simplified flowchart depicting processing performed for identifying roles with similar membership information in an identity management environment according to an embodiment of the present invention. The processing depicted in FIG. 2 may be implemented in software (e.g., code, instructions, program) executed by one or more processing units (e.g., processors, cores), hardware, or combinations thereof. The software may be stored in memory (e.g., on a non-transitory computer-readable storage medium such as a memory device). The particular series of processing steps depicted in FIG. 2 is not intended to be limiting. It is appreciated that the processing steps may be performed in an order different from that depicted in FIG. 2, and that not all the steps depicted in FIG. 2 need be performed. In one embodiment, the processing depicted in FIG. 2 is performed by the access management system 130 depicted in FIG. 1.

The processing in flowchart 200 is initiated, at 202, when access management system 130 receives a triggering event. The triggering event may be a request from a user to create a new role, to modify an existing role or to approve a new role. At 204, the access management system 130 may determine the membership information of the role that is being processed (e.g. the role that the user requested creating, modifying or approving). The membership information may identify a set of one or more members of the role that is being processed. For example, the users to whom the role is assigned (e.g. granted) may form the members of the role.

At 206, the access management system 130 determines a set of roles configured for a set of target systems. For example, the access management system 130 may access the roles information database 100 to determine role-1 102, role-2 104, etc. At 208, the access management system 130 may determine, for each particular role in the set of roles determined at 206, a measure of similarity between the role that is being processed and the existing role based upon the membership information of the role that is being processed and the membership information of the exiting role. For example, the access management system 130 may determine a first measure of similarity between the role that is being processed and role-1 102 based upon the membership information of the role that is being processed and the membership information 112 of role-1 102. The first measure of similarity may be associated with (e.g. assigned to) the first existing role (e.g. role-1 102). The access management system 130 may also determine a second measure of similarity between the role that is being processed and role-2 104 based upon the membership information of the role that is being processed and the membership information of role-2 104. The second measure of similarity may be associated with (e.g. assigned to) the second existing role (e.g. role-2 104).

At 210, the access management system 130 may determine if the membership information of the role that is being processed is similar to the membership information of one or more of the set of roles configured for the set of target systems. For example, the access management system 130 may determine if the membership information of the role that is being processed is similar to the membership information of role-1 102 or role-2 104.

In some embodiments, to determine similarity, the access management system 130 may compare the similarity scores to a predetermined similarity threshold. The access management system 130 may then identify roles associated with similarity scores that exceed the predetermined similarity threshold.

If the access management system 130 determines that the membership information of the role that is being processed is similar to the membership information of one or more of the set of roles configured for the set of target systems (YES to 210), the access management system 130 may output information related to the role(s) whose membership information is determined to be similar to the membership information of the role that is being processed based upon the membership information at 212. In some embodiments, the similar membership information may be output (e.g. displayed) to the user via a graphical user interface (GUI). The similarity information may be presented by outputting the similarity scores assigned to the existing role(s) and/or by graphically representing the overlap of the membership information between the role that is being processed and the existing role(s). In some embodiments, the access management system 130 may suggest the user to modify the membership information of the role that is being processed in light of the similarity information provided to the user. According to various embodiments, the access management system 130 may prevent the creation, modification or approval of the role that is being processed in order to prevent creating and maintaining redundant roles.

If the access management system 130 determines that the membership information of the role that is being processed is not similar to the membership information of one or more of the set of roles configured for the set of target systems (NO to 210), the processing in flowchart 200 ends at 214. For example, the access management system 130 may proceed with creation, modification or approval of the role that is being processed.

Entitlement Information Based Analysis

Upon being triggered by the user's request to create a new role, the similarity analysis subsystem 132 may also determine entitlement information associated with a new role. One of ordinary skill in the art will appreciate that membership analysis and entitlement analysis of the new role is not exclusive and that the entitlement information may be determined in addition to or instead of the membership information. The entitlement information associated with the new role may identify a set of entitlements granted to the members of the new role. An entitlement may identify one or more actions that can be performed on a target system. The similarity analysis subsystem 132 may then determine a set of existing roles configured for a set of target systems and entitlement information for each of the set of existing roles. For each role in the set of existing roles, roles similarity analysis subsystem 132 may then be configured to determine a similarity score for the existing role based upon a comparison of the set of entitlements of the existing role and the entitlements of the new role, where the similarity score computed for an existing rule indicates a degree of similarity between the entitlements of the existing role and the entitlements of the new role. Based on an amount of common entitlements that are included in the new role and each existing role, the similarity analysis subsystem 132 may assign a similarity score to each existing role.

Similarity analysis subsystem 132 may use various different techniques for computing the similarity scores. According to one technique, the similarity score for an existing role (e.g., role-1 in FIG. 1) may be a number indicating the number of entitlements that are both provided by the new role and the existing role. For example, the entitlements information for the new role may include a read-only entitlement granted for target system-1 120 and a read-write entitlement granted for target system-2 122. The similarity analysis subsystem 132 may identify that role-1 includes a read-only entitlement for target system-2 122. Based on the similarity of the entitlement information of the new role and the entitlement information of the existing role-1, the similarity analysis subsystem 132 may assign a first similarity score to the existing role-1. For example, the first similarity score may be "1" because 1 out of 3 entitlements of the new role already exist in role-1. The similarity analysis subsystem 132 may identify that role-2 includes a read-only entitlement granted for target system-1 120. Based on the similarity of the entitlements information of the new role and the entitlements information of the existing role-2, the similarity analysis subsystem 132 may assign a second similarity score to the existing role-2. For example, the second similarity score may be "1" because 1 out of 3 entitlements of the new role already exist in role-2. In this manner, a similarity score based upon the number of overlapping entitlements between the new role and the existing roles may be computed for the existing roles.

According to another technique, the similarity score for an existing role may be a number indicating the number of entitlements that are both provided by the new role and the existing role expressed as a percentage of the total entitlements of the new role. For example, the entitlements information for the new role may include a read-only entitlement granted for target system-1 120 and a read-write entitlement granted for target system-2 122. The similarity analysis subsystem 132 may identify that role-1 includes a read-only entitlement for target system-2 122. Based on the similarity of the entitlement information of the new role and the entitlement information of the existing role-1, the similarity analysis subsystem 132 may assign a first similarity score to the existing role-1. For example, the first similarity score may be "33%" because 1 out of 3 entitlements of the new role already exist in role-1. Similarly, the similarity analysis subsystem 132 may identify that role-2 includes a read-only entitlement granted for target system-1 120. Based on the similarity of the entitlements information of the new role and the entitlements information of the existing role-2, the similarity analysis subsystem 132 may assign a second similarity score to the existing role-2. For example, the second similarity score may be "33%" because 1 out of 3 entitlements of the new role already exist in role-2. In this manner, similarity scores may be computed for the existing roles. Various other similarity scoring techniques may be used in alternative embodiments.

The similarity scores are then used by similarity analysis subsystem 132 to determine if any of the existing roles have an entitlement that is deemed to be similar to the entitlement of the new role. In one embodiment, the entitlement of an existing role may be deemed to be similar to the entitlement of the new role if the similarity score computed for that existing role exceeds a certain preconfigured threshold and to be not similar otherwise. For example, in an embodiment where the similarity score is indicative of a number of entitlements that are provided by both the new role and the exiting role expressed as a percentage of the total entitlements of the new role, the threshold may be set to 85%, i.e., entitlement of an existing role is considered to be similar to the entitlement of the new role if the similarity score associated with the existing role is above 85%. In such an embodiment, using the role-1 and role-2 example discussed above, similarity analysis subsystem 132 may determine that the entitlement information of role-1 is not similar to the entitlement of the new role since the similarity score computed for role-1 is 33%. Similarly, similarity analysis subsystem 132 may determine that the entitlement information of role-2 is not similar to the entitlement of the new role since the similarity score computed for role-2 is 33% as well, which is below the similarity threshold. In this manner, based upon the similarity scores computed for the existing roles and the similarity threshold value, similarity analysis subsystem 132 may identify roles whose entitlements are deemed similar to the entitlements of the new role.

Various different actions may be performed in response to the results of the similarity analysis. In certain embodiments, information related to the results of the similarity analysis may be output to user 140. The user may then decide whether or not to continue creating the new role based upon the output results.

In one embodiment, upon determining that at least one existing role has entitlements that is determined to be similar to the entitlements of the new role being created, similarity analysis subsystem 132 (or access management system 130) may prevent the user 140 from creating the new role. The similarity analysis subsystem 132 may notify the user that an existing role, e.g., role-1, have entitlements that are determined to be similar to the entitlements of the new role that the user is trying to create and that, as a result, creation of the new role is prevented. In this manner, creation of roles with similar entitlements is prevented. In some embodiments, the similarity analysis subsystem 132 may prompt the user to modify the entitlements for the new role if the new role is to be created.

In certain embodiments, a similarity threshold may not be set for similarity analysis subsystem 132. In such an embodiment, the similarity analysis subsystem 132 may be configured to select one or more existing roles from the set of existing roles based upon the similarity scores associated with the scores and output information related to those one or more roles to the user. In one embodiment, similarity analysis subsystem 132 may select a predetermined number of top similarity scores and output information related to the associated existing roles to the user. For example, the similarity analysis subsystem 132 may output the top two similarity scores (e.g., 33% and 33% in the foregoing example) along with corresponding roles information (e.g., role-1 and role-2, respectively).

In the embodiment described above, the entitlements of the new role was compared to the entitlements of individual existing roles. In some other embodiments, the similarity analysis subsystem 132 may identify a combination of two or more of existing roles where a combination (e.g., a union of the entitlements) of the entitlements of the two or more existing roles is similar to the entitlements of the new role. In such an embodiment, the similarity analysis subsystem 132 may assign a similarity score to the combination of the two or more existing roles and compare the similarity score of the combination to the predetermined threshold.

For example, the entitlements of the new role may include A (e.g., read and write from XYZ database on target system_1), B (e.g., print from Outlook application on target system_2) and C (e.g., edit human resources information on target system_1). The entitlements of existing role-1 may include A and B. The entitlements of existing role-2 may include C. Taken individually, the similarity score assigned to existing role-1 and role-2 may be 66% and 33%, respectively, which is lower than the predetermined threshold of 85%. However, when taken as a combination (e.g., union of the entitlements of role-1 and role-2), role-1 and role-2 include all entitlements of the new role. Thus, a similarity score assigned to the combination of role-1 and role-2 would be 100%. In such a scenario, the access management system 130 may prevent the user 140 from creating the new role based on the similarity score of the combination of existing role-1 and existing role-2 (e.g., 100%) which exceeds the similarity threshold of 85%. The similarity analysis subsystem 132 may notify the user that a combination of two or more existing roles, e.g. role-1 and role-2, has a similar entitlements to the new role that the user is trying to create. In some embodiments, the similarity analysis subsystem 132 may suggest the user to modify the entitlements information of the new role.

In the foregoing exemplary embodiment, in one embodiment, the similarity score of the combination of existing role-1 and role-2 is not determined by merely taking the sum of individual similarity scores of role-1 and role-2. Rather, the similarity score is calculated for the entitlements information of the combination of role-1 and role-2. For example, if the entitlements of role-3 include A, role-3 will have a similarity score of 33% (e.g., 1 out of 3 entitlements of the new role is similar with entitlements of role-3). However, the combination of role-1 and role-3 will not have the similarity score of 100%. Rather, the similarity score for the combination of role-1 and role-3 will be 66% (2 out of 3 entitlements of the new role are similar with entitlements of the combination of role-1 and role-3).

The similar membership and entitlement information may be output (e.g. displayed) to the user via a graphical user interface (GUI). The similarity information may be presented by outputting the similarity scores of the existing role(s) and/or by graphically representing the overlap of the membership and/or entitlement information between the new role and the existing role(s).

Embodiments may perform one or both of the similarity analysis based on the membership information and the similarity analysis based on the entitlement information to determine similarity scores for the existing roles. While in some embodiments the similarity score may be determined based on either the membership information or the entitlement information, other embodiments may determine the similarity score based on both the membership information and the entitlement information. In some embodiments a final similarity score may be assigned to an existing role based on a weighted average of the membership-based similarity score and the entitlement-based similarity score of the existing role.

In embodiments where the membership-based similarity analysis results in identifying a first existing role having a membership information similar to the membership information of the new role that is being created and the entitlement-based similarity analysis results in identifying a second existing role having an entitlement information similar to the entitlement information of the new role that is being created, the access management system 130 may output information related to both the first existing role and the second existing role. In some embodiments, the first existing role may be the same as the second existing role, e.g., the membership-based similarity analysis and the entitlement-based similarity analysis may identify the same existing role(s).

In some embodiments, the similarity analysis subsystem 132 may analyze all existing roles to determine similarities and consolidate existing similar roles. For example, if the similarity analysis subsystem 132 is implemented in connection with an existing roles information database, the database may already contain redundant roles. Thus, the similarity analysis subsystem 132 may compare all existing roles against each other to identify similar roles and consolidate the identified roles.

Figure 3:
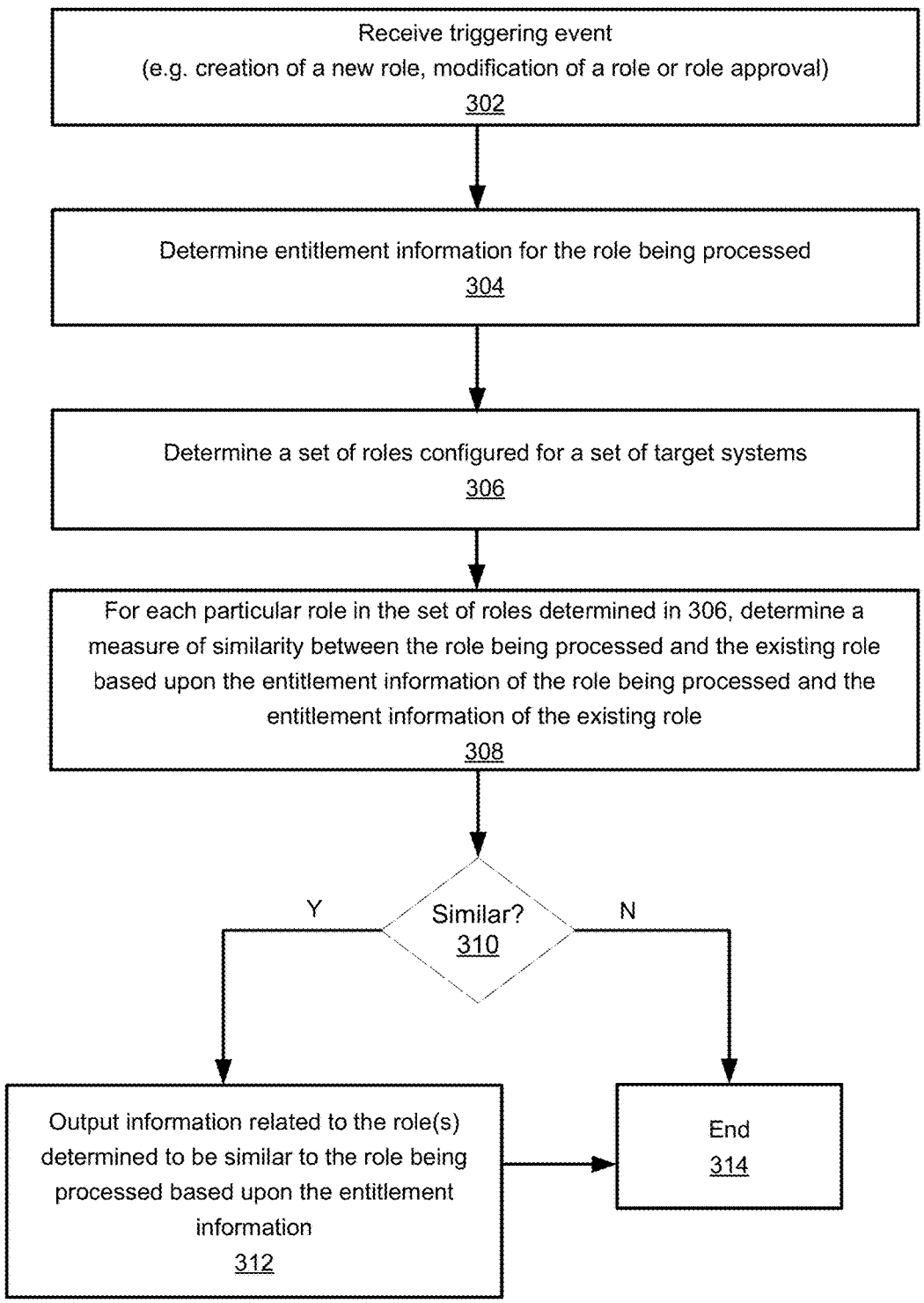
FIG. 3 depicts a simplified flowchart depicting processing performed for identifying roles with similar entitlement information in an identity management environment according to an embodiment of the present invention.

FIG. 3 depicts a simplified flowchart depicting processing performed for identifying roles with similar entitlement information in an identity management environment according to an embodiment of the present invention. The processing depicted in FIG. 3 may be implemented in software (e.g., code, instructions, program) executed by one or more processing units (e.g., processors, cores), hardware, or combinations thereof. The software may be stored in memory (e.g., on a non-transitory computer-readable storage medium such as a memory device). The particular series of processing steps depicted in FIG. 3 is not intended to be limiting. It is appreciated that the processing steps may be performed in an order different from that depicted in FIG. 3, and that not all the steps depicted in FIG. 3 need be performed. In one embodiment, the processing depicted in FIG. 3 is performed by the access management system 130 depicted in FIG. 1.

The processing in flowchart 300 is initiated, at 302, when access management system 130 receives a triggering event. The triggering event may be a request from a user to create a new role, to modify an existing role or to approve a new role. At 304, the access management system 130 may determine the entitlement information of the role that is being processed (e.g. the role that the user requested creating, modifying or approving). The entitlement information may identify how a member of the role that is being processed interacts with a target system. For example, the entitlement information may indicate that members of the role that is being processed may read from but not write to an inventory database.

At 306, the access management system 130 determines a set of roles configured for a set of target systems. For example, the access management system 130 may access the roles information database 100 to determine role-1 102, role-2 104, etc. At 308, the access management system 130 may determine, for each particular role in the set of roles determined at 206, a measure of similarity between the role that is being processed and the existing role based upon the entitlement information of the role that is being processed and the entitlement information of the exiting role. For example, the access management system 130 may determine a first measure of similarity between the role that is being processed and role-1 102 based upon the entitlement information of the role that is being processed and the entitlement information 116 of role-1 102. The first measure of similarity may be associated with (e.g. assigned to) the first existing role (e.g. role-1 102). The access management system 130 may also determine a second measure of similarity between the role that is being processed and role-2 104 based upon the entitlement information of the role that is being processed and the entitlement information of role-2 104. The second measure of similarity may be associated with (e.g. assigned to) the second existing role (e.g. role-2 104).

At 310, the access management system 130 may determine if the entitlement information of the role that is being processed is similar to the entitlement information of one or more of the set of roles configured for the set of target systems. For example, the access management system 130 may determine if the entitlement information of the role that is being processed is similar to the entitlement information of role-1 102 or role-2 104.

In some embodiments, to determine similarity, the access management system 130 may compare the similarity scores to a predetermined similarity threshold. The access management system 130 may then identify roles associated with similarity scores that exceed the predetermined similarity threshold.

If the access management system 130 determines that the entitlement information of the role that is being processed is similar to the entitlement information of one or more of the set of roles configured for the set of target systems (YES to 310), the access management system 130 may output information related to the role(s) whose entitlement information is determined to be similar to entitlement information of the role that is being processed based upon the entitlement information at 312. In some embodiments, the similar entitlement information may be output (e.g. displayed) to the user via a graphical user interface (GUI). The similarity information may be presented by outputting the similarity scores assigned to the existing role(s) and/or by graphically representing the overlap of the entitlement information between the role that is being processed and the existing role(s). In some embodiments, the access management system 130 may suggest the user to modify the entitlement information of the role that is being processed in light of the similarity information provided to the user. According to various embodiments, the access management system 130 may prevent the creation, modification or approval of the role that is being processed in order to prevent creating and maintaining redundant roles.

If the access management system 130 determines that the entitlement information of the role that is being processed is not similar to the entitlement information of one or more of the set of roles configured for the set of target systems (NO to 310), the processing in flowchart 200 ends at 314. For example, the access management system 130 may proceed with creation, modification or approval of the role that is being processed.

Figure 4:
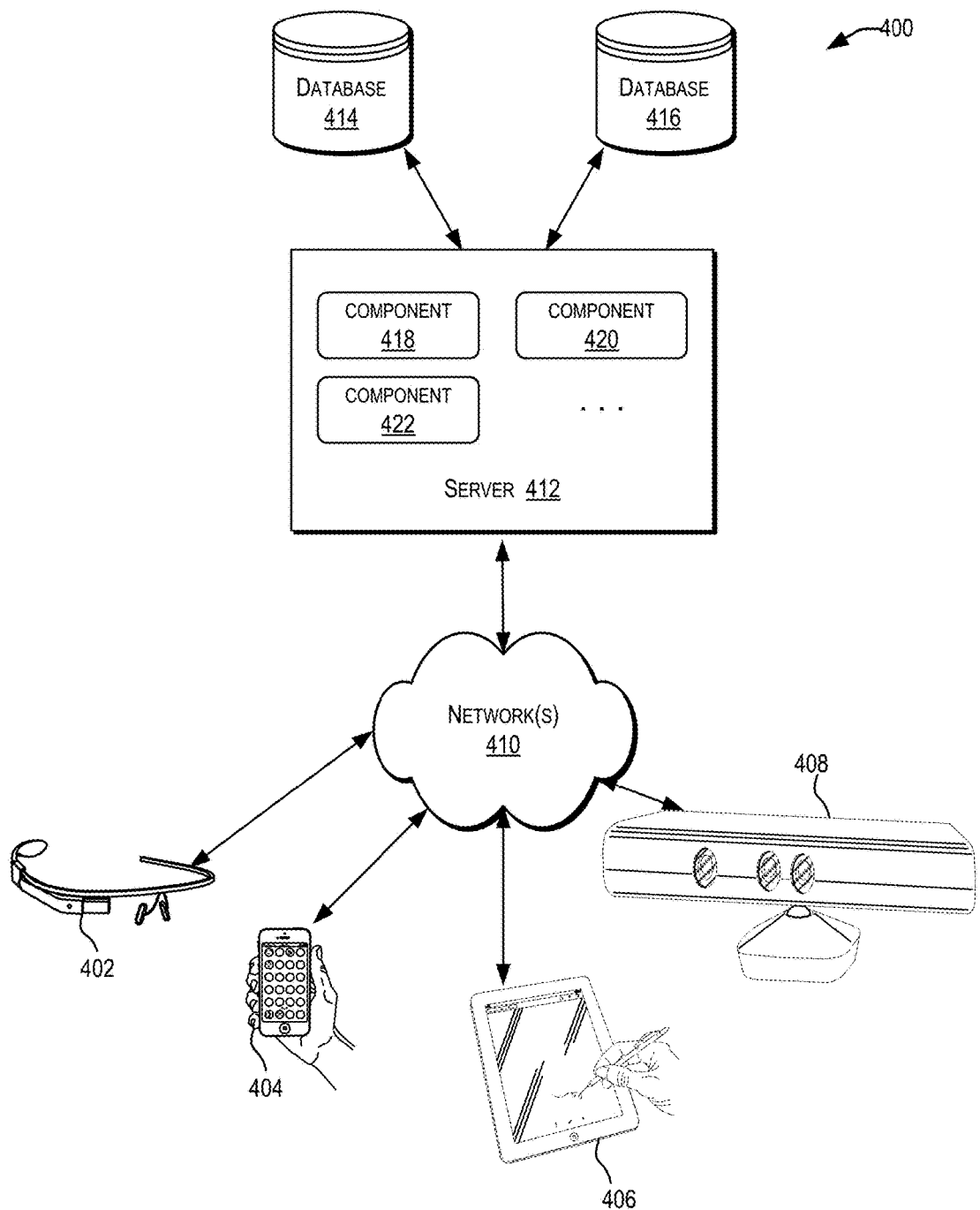
FIG. 4 depicts a simplified diagram of a distributed system for implementing an embodiment.

FIG. 4 depicts a simplified diagram of a distributed system 400 for implementing an embodiment. In the illustrated embodiment, distributed system 400 includes one or more client computing devices 402, 404, 406, and 408, which are configured to execute and operate client applications such as a web browser, proprietary client (e.g., Oracle Forms), or the like over one or more network(s) 410. Server 412 may be communicatively coupled with remote client computing devices 402, 404, 406, and 408 via network 410.

In various embodiments, server 412 may be adapted to run one or more services or software applications such as services and applications that provide the digital document (e.g., webpage) analysis and modification-related processing described above. In certain embodiments, server 412 may also provide other services or software applications that can include non-virtual and virtual environments. In some embodiments, these services may be offered as web-based or cloud services, such as under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in FIG. 4, server 412 may provide the functionality provided by adaptive webpages system 42. The functionality may be provided by software components 418, 420 and 422 implemented on server 412. In certain embodiments, client computing devices 402, 404, 406, and/or 408 may also implement one or more components that facilitate the interactions analysis and digital document modification functionality. Users operating the client computing devices may then utilize one or more client applications to use the services provided by these components. These components may be implemented in hardware, firmware, software, or combinations thereof. It should be appreciated that various different system configurations are possible, which may be different from distributed system 400. The embodiment shown in FIG. 4 is thus one example of a distributed system for implementing an embodiment system and is not intended to be limiting.

Users may use client computing devices 402, 404, 406, and/or 408 to request digital documents (e.g., to request webpages). The documents received by a client in response to the document request may then be output to the user of the device via an interface of the client device. Although FIG. 4 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone, Android™, BlackBerry® 4, Palm OS). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device), and the like. The client devices may be capable of executing various different applications such as various Internet-related apps, communication applications (e.g., E-mail applications, short message service (SMS) applications) and may use various communication protocols.

Network(s) 410 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 410 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 412 can include one or more virtual machines running virtual operating systems, or other computing architectures involving virtualization such as one or more flexible pools of logical storage devices that can be virtualized to maintain virtual storage devices for the server. In various embodiments, server 412 may be adapted to run one or more services or software applications that provide the functionality described in the foregoing disclosure.

The computing systems in server 412 may run one or more operating systems including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more data repositories such as databases 414 and 416. These databases may provide a mechanism for storing information such as user interactions information, usage patterns information, adaptation rules information, and other information used by embodiments of the present invention. Databases 414 and 416 may reside in a variety of locations. By way of example, one or more of databases 414 and 416 may reside on a non-transitory storage medium local to (and/or resident in) server 412. Alternatively, databases 414 and 416 may be remote from server 412 and in communication with server 412 via a network-based or dedicated connection. In one set of embodiments, databases 414 and 416 may reside in a storage-area network (SAN). Similarly, any necessary files for performing the functions attributed to server 412 may be stored locally on server 412 and/or remotely, as appropriate. In one set of embodiments, databases 414 and 416 may include relational databases, such as databases provided by Oracle, that are adapted to store, update, and retrieve data in response to SQL-formatted commands.

Figure 5:
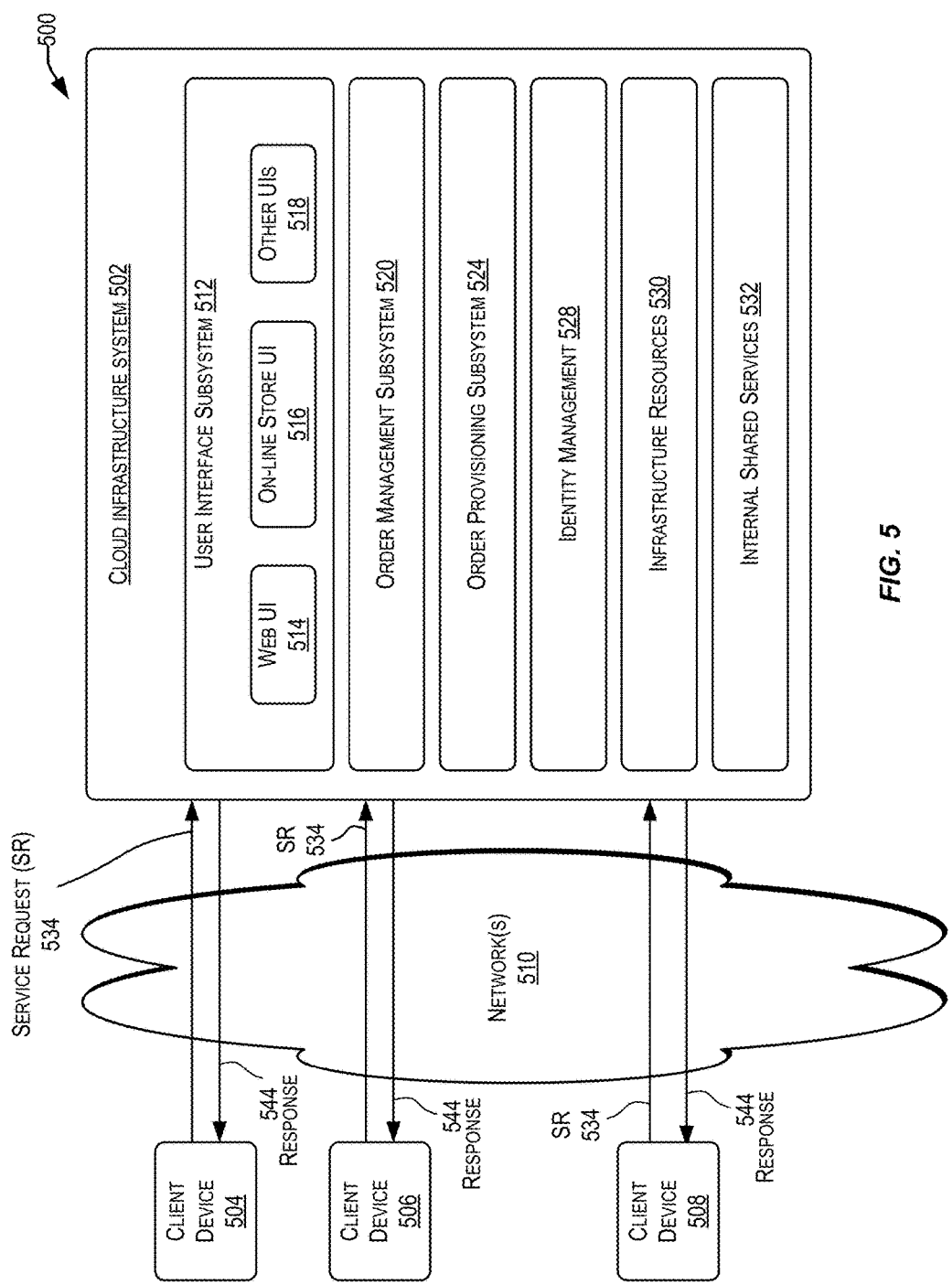
FIG. 5 is a simplified block diagram of one or more components of a system environment in which services may be offered as cloud services, in accordance with an embodiment of the present disclosure.

In certain embodiments, the document analysis and modification services described above may be offered as services via a cloud environment. FIG. 5 is a simplified block diagram of a cloud-based system environment 500 in which services, such as the dynamic modification of digital documents responsive to usage patterns as described above, may be offered as cloud services, in accordance with an embodiment of the present disclosure. In the illustrated embodiment in FIG. 5, cloud infrastructure system 502 may provide one or more cloud services that may be requested by users using one or more client computing devices 504, 506, and 508. Cloud infrastructure system 502 may comprise one or more computers and/or servers that may include those described above for server 1012. The computers in cloud infrastructure system 502 may be organized as general purpose computers, specialized server computers, server farms, server clusters, or any other appropriate arrangement and/or combination.

Network(s) 510 may facilitate communication and exchange of data between clients 504, 506, and 508 and cloud infrastructure system 502. Network(s) 510 may include one or more networks. The networks may be of the same or different types. Network(s) 510 may support one or more communication protocols, including wired and/or wireless protocols, for facilitating the communications.

The embodiment depicted in FIG. 5 is only one example of a cloud infrastructure system that may incorporate an embodiment of the invention and is not intended to be limiting. It should be appreciated that, in some other embodiments, cloud infrastructure system 502 may have more or fewer components than those depicted in FIG. 5, may combine two or more components, or may have a different configuration or arrangement of components. For example, although FIG. 5 depicts three client computing devices, any number of client computing devices may be supported in alternative embodiments.

The term "cloud service" is generally used to refer to a service that is made available to users on demand and via a communication network such as the Internet by systems (e.g., cloud infrastructure system 502) of a cloud service provider. Typically, in a public cloud environment, servers and systems that make up the cloud service provider's system are different from the customer's own on-premises servers and systems and are managed by the cloud service provider. This enables customers to acquire cloud services without the need for the customers to purchase separate licenses, support, or hardware and software resources for the services. For example, a cloud service provider's system may host an application, and a user may, via the Internet, on demand, order and use the application. Cloud services are designed to provide easy, scalable access to applications, resources and services. Examples of cloud services provided by Oracle Corporation® of Redwood Shores, Calif., include without limitation, middleware service, database service, Java cloud service, and others.

Cloud infrastructure system 502 may provide one or more cloud services. These services may be provided under various models such as under a Software as a Service (SaaS) model, a Platform as a Service (PaaS) model, an Infrastructure as a Service (IaaS) model, and others including hybrid service models. For example, a SaaS model may be used to provide customers access to on-demand applications that are hosted by cloud infrastructure system 502. SaaS thus enables an application or software to be delivered to a customer over a communication network like the Internet, as a service, without the customer having to buy the hardware or software for the underlying application. The IaaS model is generally used to provide infrastructure resources (e.g., servers, storage, hardware and networking resources) to a customer as a cloud service. The PaaS model is generally used to provide, as a service, platform and environment resources that enable customers to develop, run, and manage applications and services without the customer having to procure, build, or maintain such resources. Examples of services provided under the IaaS model include, without limitation, Oracle Java Cloud Service (JCS) and Oracle Database Cloud Service (DBCS) provided by Oracle Corporation, Redwood Shores, Calif., and others. An example of a cloud infrastructure system is the Oracle Public Cloud provided by Oracle Corporation. Cloud infrastructure system 502 may include a suite of applications, middleware, databases, and other resources that enable provision of the various cloud services.

Cloud services are generally provided on an on demand basis self-service basis, subscription-based, elastically scalable, reliable, highly available, and secure manner. For example, a customer, via a subscription order, may order one or more services provided by cloud infrastructure system 502. Cloud infrastructure system 502 then performs processing to provide the services in the customer's subscription order. For example, a website provider may request cloud infrastructure system to monitor a particular set of users' interactions with webpages provided by that website and provide automated modification capability for these webpages responsive to usage patterns determined based upon the monitored information. In addition to services related to dynamic document modification responsive to usage patterns, cloud infrastructure system 502 may be configured to provide other services.

Cloud infrastructure system 502 may provide the cloud services via different deployment models. In a public cloud model, cloud infrastructure system 502 may be owned by a third party services provider and the cloud services are offered to any general public customer, where the customer can be an individual or an enterprise. In other embodiments, under a private cloud model, cloud infrastructure system 502 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 502 and the services provided may be shared by several organizations in a related community. Various other models such as hybrids of the above mentioned models may also be used.

Client computing devices 504, 506, and 508 may be devices similar to those described above for 402, 404, 406, and 408 and may be capable of operating one or more client applications such as a web browser and other applications. A user may use a client device to interact with cloud infrastructure system 502 such as to request a service provided by cloud infrastructure system 502 using a client device, provide adaptation rules, etc. Client devices may also be used to request digital documents and to receive modified digital documents according to the teachings of the embodiments of the present invention.

In some embodiments, the processing performed by cloud infrastructure system 502 for providing interactions monitoring and dynamic document modification services may involve "big data" analysis. The term "big data" is generally used to refer to extremely large data sets that can be stored, analyzed, and manipulated to detect and visualize various trends, behaviors, relationships, etc. within the data. Big data analysis may involve multiple processors processing the data possibly in parallel, performing simulations using the data, and the like. For example, analysis of the collected user interactions information and deriving usage patterns from the collected data for multiple sets of users and then using the usage patterns to drive modifications of documents may involve "big data" analysis. The data that is collected and analyzed may include structured data (e.g., data stored in a database or structured according to a structured model) and/or unstructured data (e.g., data blobs (binary large objects)).

As depicted in the embodiment in FIG. 5, cloud infrastructure system 502 may also include infrastructure resources 530 that are utilized for facilitating the provision of cloud services by cloud infrastructure system 502. Infrastructure resources 530 may include, for example, processing resources, storage or memory resources, networking resources, and the like. In certain embodiments, to facilitate efficient provision of these resources for supporting the various cloud services provided by cloud infrastructure system 502 for different customers, the resources may be bundled into resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources from the first set of pods, may be provisioned for Java service, and the like. For some services, the resources allocated for provisioning the services may be shared between the services.

Cloud infrastructure system 502 may itself internally use services 532 that are shared by different components of cloud infrastructure system 502 and which facilitate the provision of services by cloud infrastructure system 502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 502 may comprise a user interface subsystem 512 that enables users or customers of cloud infrastructure system 502 to interact with cloud infrastructure system 502. User interface subsystem 512 may include various different interfaces such as a web interface 514, an online store interface 516 where cloud services provided by cloud infrastructure system 502 are advertised and are purchasable by a consumer, and other interfaces 518. For example, a customer may, using a client device, request (service request 534) one or more services provided by cloud infrastructure system 502 using one or more of interfaces 514, 516, and 518. For example, a customer may access the online store, browse cloud services offered by cloud infrastructure system 502, and place a subscription order for one or more services offered by cloud infrastructure system 502 that the customer wishes to subscribe to. The service request may include information identifying the customer and one or more services that the customer desires to subscribe to. For example, a customer may order the digital document modification service offered by cloud infrastructure system 502.

Cloud infrastructure system 502 may comprise various modules for handling service requests received from customers. These modules may be implemented in hardware or software or combinations thereof. In one embodiment, an order management subsystem (OMS) 520 may be provided that is configured to process the new order. As part of this processing, OMS 520 may be configured to: create an account for the customer, if not done already; receive billing and/or accounting information from the customer that is to be used for billing the customer for providing the requested service to the customer; verify the customer information;

upon verification, book the order for the customer; and orchestrate various workflows to prepare the order for provisioning.

Order provisioning subsystem (OPS) 524 may be configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 524 is configured to determine the cloud service being requested and identify a number of pods that may have been pre-configured for that cloud service. The number of pods that are allocated may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 502 may send a response or notification 544 to the requesting customer to indicate that the requested service is now ready for use. In some instances, information (e.g. a link) may be sent to the customer that enables the customer to start using and availing the benefits of the requested services.

Cloud infrastructure system 502 may provide services to multiple customers. For each customer, cloud infrastructure system 502 is responsible for managing information related to one or more subscription orders from the customer, maintaining customer data related to the orders, and providing the requested services to the customer. Cloud infrastructure system 502 may also collect usage statistics regarding a customer's use of subscribed services. For example, statistics may be collected for the amount of storage used, the amount of data transferred, the number of users, and the amount of system up time and system down time, and the like. This usage information may be used to bill the customer. In this manner, cloud infrastructure system 502 may store information, including possibly proprietary information, for multiple customers.

In certain embodiments, cloud infrastructure system 502 comprises an identity management subsystem (IMS) 528 for managing customers information and providing the separation of the managed information such that information related to one customer is not accessible by another customer. IMS 528 may be configured to provide identity services, such as information access management, authentication and authorization services, manage customer identities and roles and related capabilities, and the like.

Figure 6:
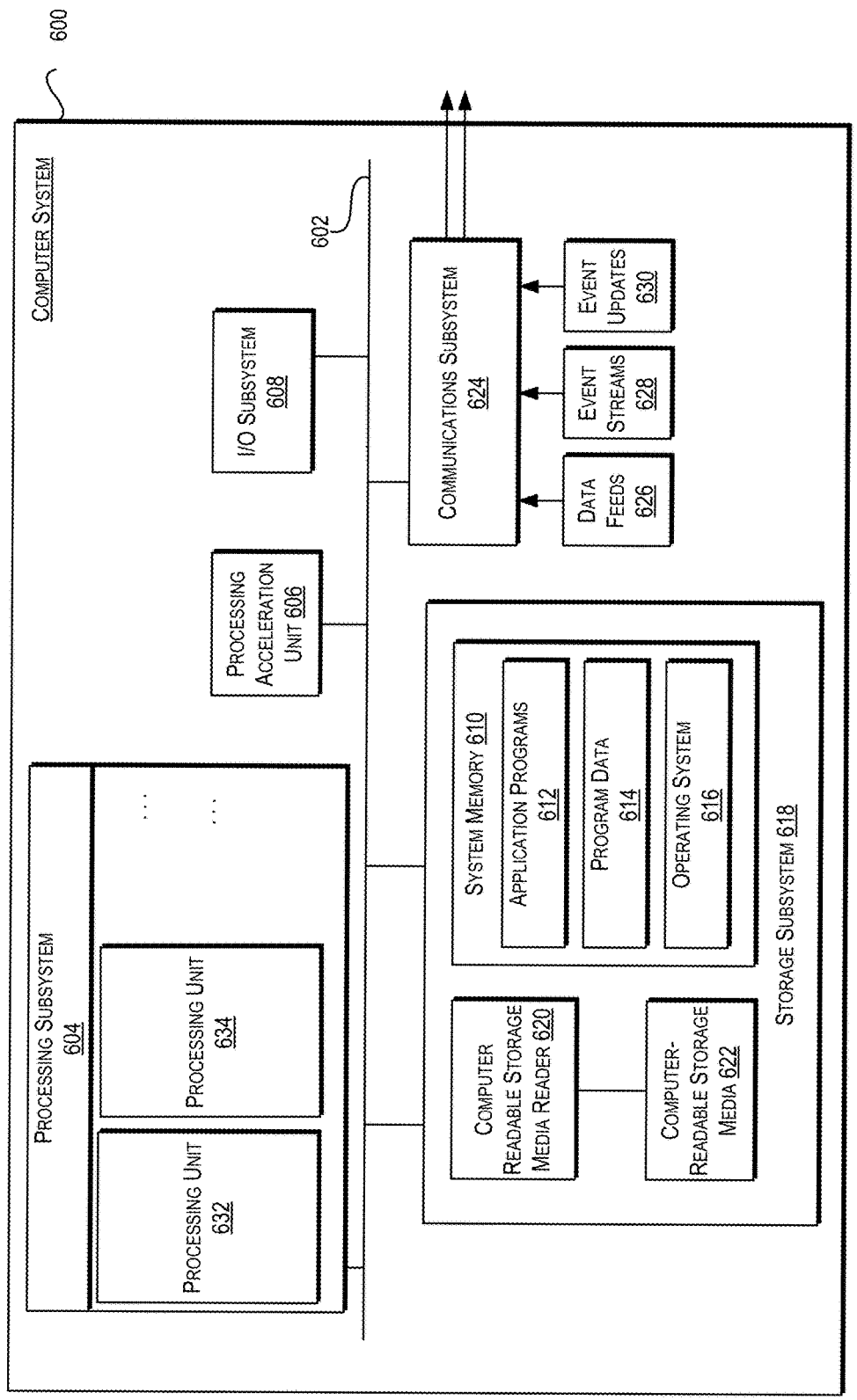
FIG. 6 illustrates an exemplary computer system that may be used to implement an embodiment of the present invention.

FIG. 6 illustrates an exemplary computer system 600 that may be used to implement an embodiment of the present invention. In some embodiments, computer system 600 may be used to implement any of the various servers and computer systems described above. As shown in FIG. 6, computer system 600 includes various subsystems including a processing subsystem 604 that communicates with a number of other subsystems via a bus subsystem 602. These other subsystems may include a processing acceleration unit 606, an I/O subsystem 608, a storage subsystem 618, and a communications subsystem 624. Storage subsystem 618 may include tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processing units 632, 634, etc. A processing unit may include be one or more processors, including single core or multicore processors, one or more cores of processors, or combinations thereof. In some embodiments, processing subsystem 604 can include one or more special purpose co-processors such as graphics processors, digital signal processors (DSPs), or the like. In some embodiments, some or all of the processing units of processing subsystem 604 can be implemented using customized circuits, such as application specific integrated circuits (ASICs), or field programmable gate arrays (FPGAs).

In some embodiments, the processing units in processing subsystem 604 can execute instructions stored in system memory 610 or on computer readable storage media 622. In various embodiments, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above for dynamically modifying documents (e.g., webpages) responsive to usage patterns.

In certain embodiments, a processing acceleration unit 606 may be optionally provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term "input device" is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term "output device" is intended to include all possible types of devices and mechanisms for outputting information from computer system 600 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 618 provides a repository or data store for storing information that is used by computer system 600. Storage subsystem 618 provides a tangible non-transitory computer-readable storage medium for storing the basic programming and data constructs that provide the functionality of some embodiments. Software (programs, code modules, instructions) that when executed by processing subsystem 604 provide the functionality described above may be stored in storage subsystem 618. The software may be executed by one or more processing units of processing subsystem 604. Storage subsystem 618 may also provide a repository for storing data used in accordance with the present invention.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM) or dynamic random access memory (DRAM).

By way of example, and not limitation, as depicted in FIG. 6, system memory 610 may store application programs 612, which may include various applications such as Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 622 may store programming and data constructs that provide the functionality of some embodiments. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, DVD, a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 622 may provide storage of computer-readable instructions, data structures, program modules, and other data for computer system 600.

In certain embodiments, storage subsystem 618 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for storing computer-readable information.

In certain embodiments, computer system 600 may support virtualization technologies, including but not limited to virtualization of processing and memory resources. For example, computer system 600 may provide support for executing one or more virtual machines. Computer system 600 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 600. Accordingly, multiple operating systems may potentially be run concurrently by computer system 600. Each virtual machine generally runs independently of the other virtual machines.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via the Internet for receiving and sending information from and to the client devices.

Communication subsystem 624 may support both wired and/or wireless communication protocols. For example, in certain embodiments, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

Communication subsystem 624 can receive and transmit data in various forms. For example, in some embodiments, in addition to other forms, communications subsystem 624 may receive input communication in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to communicate data from computer system 600 to other computer systems or networks. The data may be communicated in various different forms such as structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation such as by executing computer instructions or code, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A system comprising:
  one or more processors; and
  a memory coupled with and readable by the one or more processors, the memory configured to store a set of instructions which, when executed by the one or more processors, cause the one or more processors to:
    determine, responsive to a triggering event, membership information and entitlement information associated with a first role, wherein the membership information associated with the first role identifies a set of one or more members of the first role, and wherein the entitlement information associated with the first role identifies a set of one or more entitlements granted by the first role;
    determine a plurality of roles configured for a set of target systems, the plurality of roles not including the first role;
    for each role in the plurality of roles:
      determine a set of one or more members for the role in the plurality of roles;
      determine a set of one or more entitlements for the role in the plurality of roles; and determine a similarity score for the role in the plurality of roles based upon the set of one or more members of the first role, the set of one or more members of the role in the plurality of roles, the set of one or more entitlements of the first role, and the set of one or more entitlements for the role in the plurality of roles;

determine at least a second role from the plurality of roles based upon the similarity scores determined for the roles in the plurality of roles; and output information related to at least the second role.

2. The system of claim 1, wherein the triggering event is triggered when the first role is being created, the first role is being modified, or the first role is being approved.

3. The system of claim 1, wherein an entitlement determines how a member of the first role interacts with a target system.

4. The system of claim 1, wherein the set of instructions to determine the similarity score comprises instructions, which when executed by the one or more processors, cause the one or more processors to:

determine a set of common members comprising one or more members that are included in the set of members of the first role and also included in the set of members of the role in the plurality of roles;

determine a set of common entitlements comprising one or more entitlements that are included in the set of entitlements of the first role and also included in the set of entitlements of the role in the plurality of roles; and determine the similarity score for the role in the plurality of roles based upon a number of members in the set of common members and a number of entitlements in the set of common entitlements.

5. The system of claim 1, wherein the set of instructions to determine the similarity score for the role in the plurality of roles based upon the set of members of the first role and the set of members of the role in the plurality of roles comprises instructions, which when executed by the one or more processors, cause the one or more processors to:

determine a set of common members comprising one or more members that are included in the set of members of the first role and also included in the set of members of the role in the plurality of roles; and determine the similarity score for the role in the plurality of roles based upon a number of members in the set of common members.

6. A method comprising:

determining, by a computing device and responsive to a triggering event, membership information associated with a first role, wherein the membership information associated with the first role identifies a set of one or more members of the first role;

determining, by the computing device, a plurality of roles configured for a set of target systems, the plurality of roles not including the first role;

determining, by the computing device and responsive to the triggering event, entitlement information associated with the first role, wherein the entitlement information identifies one or more entitlements granted to the one or more members of the first role;

for each role in the plurality of roles:
  determining a set of one or more members for the role in the plurality of roles; and
  determine a set of one or more entitlements for the role in the plurality of roles; and
  determining a similarity score for the role in the plurality of roles based upon the set of members of the first role and the set of members of the role in the plurality of roles and based upon the set of entitlements of the first role and the set of entitlements of the role in the plurality of roles;

determining, by the computing device, at least a second role from the plurality of roles based upon the similarity scores determined for the roles in the plurality of roles; and outputting, by the computing device, information related to at least the second role.

7. The method of claim 6, wherein the triggering event is triggered when the first role is being created, the first role is being modified, or the first role is being approved.

8. The method of claim 6, wherein an entitlement determines how a member of the first role interacts with a target system.

9. The method of claim 6, further comprising:

determining a set of common members comprising one or more members that are included in the set of members of the first role and also included in the set of members of the role in the plurality of roles;

determining a set of common entitlements comprising one or more entitlements that are included in the set of entitlements of the first role and also included in the set of entitlements of the role in the plurality of roles; and determining the similarity score for the role in the plurality of roles based upon a number of members in the set of common members and a number of entitlements in the set of common entitlements.

10. A non-transitory computer-readable storage medium storing a plurality of instructions executable by one or more processors, the plurality of instructions when executed by the one or more processors cause the one or more processors to:

determine, responsive to a triggering event, membership information and entitlement information associated with a first role, wherein the membership information associated with the first role identifies a set of one or more members of the first role, and wherein the entitlement information associated with the first role identifies a set of one or more entitlements granted by the first role;

determine a plurality of roles configured for a set of target systems, the plurality of roles not including the first role;

for each role in the plurality of roles:
  determine a set of one or more members for the role in the plurality of roles;
  determine a set of one or more entitlements for the role in the plurality of roles; and
  determine a similarity score for the role in the plurality of roles based upon the set of one or more members of the first role, the set of one or more members of the role in the plurality of roles, the set of one or more entitlements of the first role, and the set of one or more entitlements for the role in the plurality of roles;

determine at least a second role from the plurality of roles based upon the similarity scores determined for the roles in the plurality of roles; and output information related to at least the second role.

11. The non-transitory computer-readable storage medium of claim 10, wherein the triggering event is triggered when the first role is being created, the first role is being modified, or the first role is being approved.

12. The non-transitory computer-readable storage medium of claim 10, wherein an entitlement determines how a member of the first role interacts with a target system.

13. The non-transitory computer-readable storage medium of claim 10, wherein the plurality of instructions when executed by the one or more processor further cause the one or more processors to:
   determine a set of common members comprising one or more members that are included in the set of members of the first role and also included in the set of members of the role in the plurality of roles;
   determine a set of common entitlements comprising one or more entitlements that are included in the set of entitlements of the first role and also included in the set of entitlements of the role in the plurality of roles; and
   determine the similarity score for the role in the plurality of roles based upon a number of members in the set of common members and a number of entitlements in the set of common entitlements.

14. The non-transitory computer-readable storage medium of claim 10, wherein the plurality of instructions to determine the similarity score for the role in the plurality of roles comprises instructions, which when executed by the one or more processors, cause the one or more processors to:
   determine a set of common members comprising one or more members that are included in the set of members of the first role and also included in the set of members of the role in the plurality of roles; and
   determine the similarity score for the role in the plurality of roles based upon a number of members in the set of common members.

* * * * *